United States Patent [19]

Kabat et al.

[11] 4,193,006

[45] Mar. 11, 1980

[54] MULTI-STAGE CONTROLLER

[75] Inventors: John L. Kabat, Bloomington; Arlon D. Kompelien, Richfield, both of Minn.

[73] Assignee: Honeywell Inc., Minneapolis, Minn.

[21] Appl. No.: 941,441

[22] Filed: Sep. 11, 1978

[51] Int. Cl.² ............... G05D 23/24; H05B 1/02; G05B 11/16
[52] U.S. Cl. .................... 307/117; 328/72; 340/309.1; 236/1 C; 236/91 F
[58] Field of Search ............ 307/117, 38, 39, 41, 307/208, 220 R, 225 R, 265, 267, 132 EA, 132 T, 141, 155; 318/596, 603; 328/72, 73, 74; 219/492, 494; 236/1 C, 46 F, 46 R, 91 R, 91 F; 165/14, 26..

[56] References Cited

U.S. PATENT DOCUMENTS

| | | | |
|---|---|---|---|
| 3,586,869 | 6/1971 | Kompelien | 307/117 |
| 3,623,545 | 11/1971 | Pinckaers | 307/39 |

Primary Examiner—L. T. Nix
Assistant Examiner—S. D. Schreyer
Attorney, Agent, or Firm—Alfred N. Feldman

[57] ABSTRACT

A multi-stage condition control system of the time proportional type is shown. The control system utilizes a counting means as part of the anticipation for system control. The counting means counts during the time the control system is within its proportional band. When the control system moves outside of the proportional band, the counting stops. A count detection circuit senses the absence of counts thereby indicating that the system is outside of the proportional band. The absence of counts is then used to increase or decrease multiple stages of condition control equipment to bring the system back within the proportional band.

13 Claims, 2 Drawing Figures

MULTI-STAGE CONTROLLER

CROSS-REFERENCE TO RELATED APPLICATIONS

The present application is related to the pending application Ser. No. 872,867 in the name of Arlon D. Kompelien which was filed on Jan. 27, 1978, and to the pending application Ser. No. 928,667 in the name of Ronald Benton which was filed on July 28, 1978, both of which are assigned to the assignee of the present invention.

BACKGROUND OF THE INVENTION

Multi-stage proportional control systems that are condition responsive are known. One of the major applications of this type of condition responsive control system is the control of heating and cooling equipment. The present invention is generally applicable to condition control systems that utilizes a condition responsive time proportional control, but will be described in terms of a thermostatically controlled system or thermostat.

In an electronic thermostat, anticipation can be achieved electronically. This has the advantage of not being affected by air flow and thus eliminates all of the problems associated with thermal anticipation. One method of obtaining this type of anticipation is the use of a resistor and capacitor charge and discharge arrangement as part of the negative feedback of an electronic amplifier while using a fixed positive feedback. This type of electronic anticipation is injected as a negative feedback mode with a single order time constant. For proper system operation, this time constant may need to be in the order of sixteen minutes. To obtain this type of a time constant with a single resistor-capacitor arrangement requires high resistances and a very low leakage, large capacitor. The size of the resistors and capacitor would place a burden on the cost of the device, and on the physical size of the thermostat itself, making electronic anticipation obtained in this fashion impractical for many thermostatic applications.

To obtain the desired time constant of approximately sixteen minutes, a relatively small capacitor and reasonably sized resistors can be used, thereby obtaining the relatively fast cycling rate in the time proportional control circuit. This relatively fast cycling rate can then be directly counted. If a counter is allowed to count up at a given rate during the "on" time of the anticipation, and another counter is allowed to count up at the same rate during the "off" time, we would have a digital representation of the "on" and "off" time periods for the desired operating condition (that is the actual deviation from the set point of the room temperature). The sum of these two counters is the cycling period. This type of information gives a complete description of the cycling pattern of the system for a constant input of a given magnitude. If the average room temperature and the set point remain constant, we would then let the cycling pattern continue but no longer allow the counters to count up. Each time the "on-off" action of the comparator or electronics occurs, the time counter would be reduced by a one count. When the counter reaches zero counts, the system will turn "off." The "off-on" action of the comparator or electronic amplifier would then start to count down the "off" time counter. When the "off" time counter reaches zero, the system would turn "on" and the counters would be allowed to count up at the given rate. This multiplies the "on" and "off" period by the number of counts stored in the counters. Since the basic "on" and "off" periods are determined by a constant, the concept also effectively multiplies by that same constant. To keep the system closer to the actual operating conditions, the "off" period counter can be updated each time the "on" period counter is counted down. Similarly, the "on" period counter can be updated each time the "off" period counter is counted down.

As thus described, the system will work well as long as the comparator is cycling. However, if a set point change is made or the deviation from the set point is such that the cycling stops, there is a possibility that the control can go out of "phase." That is, the furnace can be "on" when it should be "off," or the opposite can occur. Therefore, some means must be provided that will sense when these conditions occur and force the output into the proper state. One way would be to use two level detectors which could force the output into the proper state when the deviation from the set point is greater than the maximum anticipation signal or when the deviation is effectively negative. This method would involve a very critical calibration.

In the mentioned applications, a condition responsive time proportional control means has been specifically disclosed for a temperature responsive control means or a thermostat. The time proportional circuit utilizes a relatively small capacitor and resistors, and has a rapid cycling rate. This rapid cycling rate is sensed by a unidirectional counter that forms part of a counting means. The unidirectional counter, in one simple form, is a ripple counter. The cycling rate of the time proportional control means is combined with a pulse generating means so that the time constant of the overall control system can be multiplied by the pulse rate of the pulse generating means. The arrangement has the advantage in that the system can never go out of synchronization with the state of the condition being responded to even if there is a sudden change in the condition or a sudden change in the set point of the condition responsive system. The capacitor of the cycler or the cycling rate of the condition responsive time proportional control means can be changed to tune the cycle rate of the control system for any particular application without changing the system droop.

SUMMARY OF THE INVENTION

The present invention utilizes a condition control system of the type previously disclosed wherein a condition responsive time proportional control means has a switched output and that switched output is fed into a counting means. The counting means is used to provide for the necessary anticipation and can be considered as an electronic anticipation arrangement for a temperature control system or thermostat. When the condition responsive time proportional control means is within the normal proportional band of control, the switched output means provides a repetitively switched output signal that is counted by the counting means and which ultimately controls the plant output logic to in turn operate such equipment as heating and cooling equipment.

When the condition control means is outside of the proportional band, the output to the counter is either a continuous 1 or a continuous 0. This would indicate the need to add additional stages of heating or cooling or the deletion of additional stages of heating or cooling.

In the present invention a count detection means in the form of an additional counting means has been added. When the condition responsive time proportional control means is within the proportional band and has a series of counts being fed into the first counting means, the count detection means counter is kept reset and provides no change in output to the various stages of heating and cooling. This indicates that the number of stages of heating or cooling that are active are correct to maintain the level of control desired.

If the condition responsive time proportional control means moves outside of the proportional band and its output becomes either a constant 0 or a 1, the count detection means begins to count thereby indicating the need to turn "on" or "off" additional stages. The count detection means has a relatively short counting capacity compared to the anticipation counting means for the system, and normally would be selected to have a short counting time of approximately four time constants of the condition responsive time proportional control means. As soon as the count detection means counts out, it provides an output signal to the condition control operating means or the stages which cause the additional heating or cooling equipment to be added or subtracted. When this occurs, sequential staging circuits cause additional stages of heating or cooling to be activated, and simultaneously feed a signal back to the condition responsive time proportional control means offsetting the input to the system. As soon as enough stages of heating or cooling have been added or subtracted to bring the system back within the proportional band, the count detection means counter begins receiving reset pulses and does not cause any further change in the system control until the system moves outside of the proportional band again.

The present invention discloses the concept in its general form and provides an example of how the control would be applied to a heating and cooling control system having multiple stages of heating and/or cooling.

DESCRIPTION OF THE PREFERRED EMBODIMENT

Figure 1:
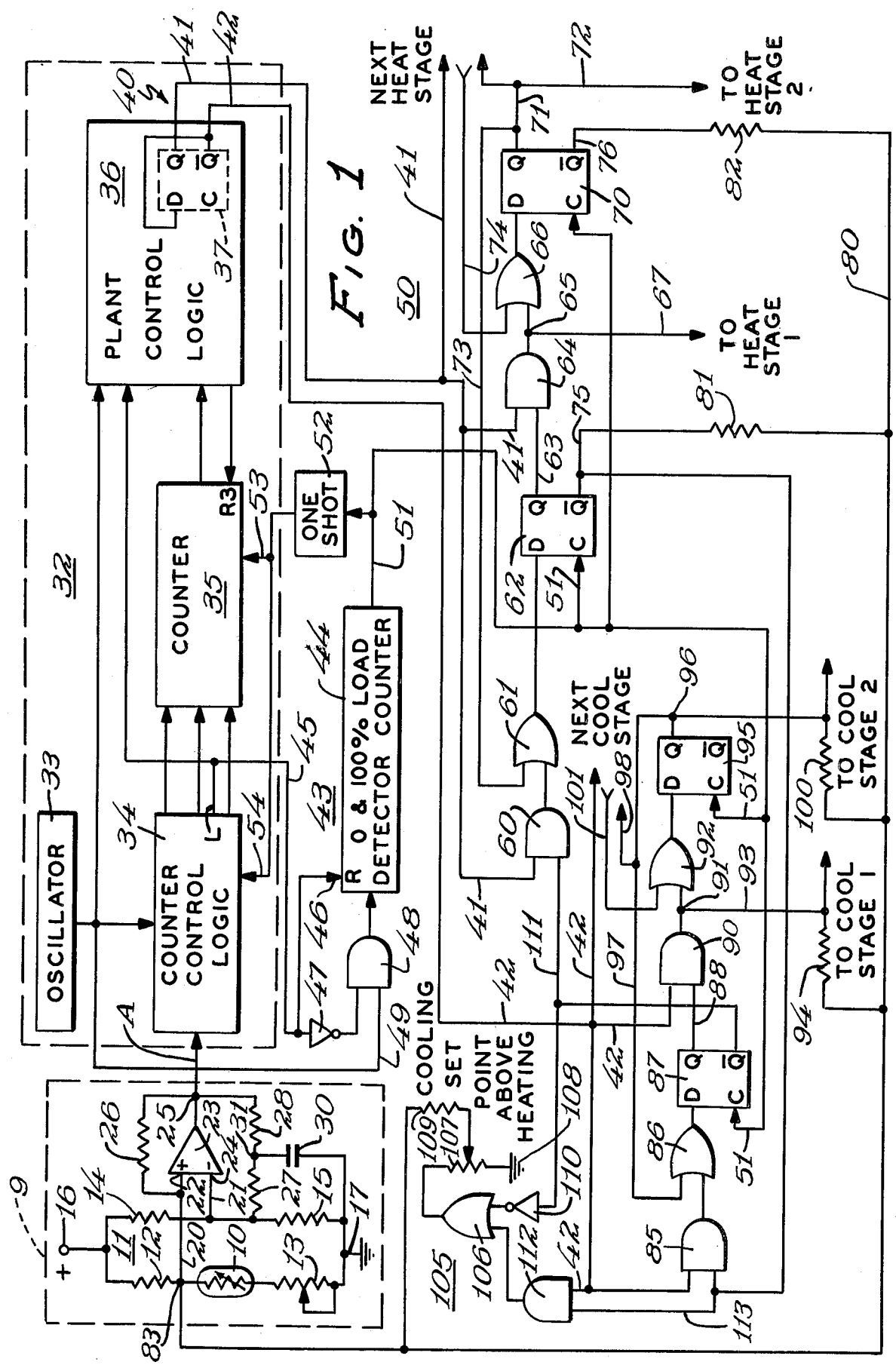
FIG. 1 is a schematic representation of the entire multi-stage control system in which both heating and cooling control is shown.

A complete multi-stage condition control system is disclosed in FIG. 1. While the present condition control system can respond to any type of condition responsive means, the description will be generally directed to a thermostat or temperature responsive type of condition control system. A condition responsive time proportional control means is disclosed at 9. A condition responsive element 10, disclosed as a temperature responsive resistor, is provided in a bridge circuit 11 that includes a further resistor 12 and a set point potentiometer 13 as one leg of the bridge. The second leg of the bridge includes a voltage divider made up of resistors 14 and 15. The bridge means 11 is energized from a potential generally connected at 16 with a common or ground 17. If the presently disclosed device were a thermostat and the temperature responsive resistor 10 was used, it would normally be a negative temperature coefficient resistor for sensing and controlling the ambient temperature while the set point potentiometer 13 would establish the point of control for the system.

The output of the bridge means 11 is on a pair of conductors 20 and 21 with the conductor 20 connected to the non-inverting terminal 22 of an operational amplifier 23 while the inverting terminal 24 is connected to the conductor 21. The operational amplifier 23 has an output at the junction 25. Between the junction 25 and the conductor 20, a positive feedback resistor 26 is provided to create a positive differential for the system. Between the junction 25 and the conductor 21, a further pair of resistors 27 and 28 are provided along with a capacitor 30 that is connected at a common point 31 between the resistors 27 and 28. The network of resistors and capacitor between the junction 25 and the inverting terminal 24 of the operational amplifier 23 provides a time proportional negative feedback which is responsible, along with the resistors 14 and 15, for a time constant in the control systems operation. In the present disclosure the time constant created by the resistors 14, 15, 27 and 28 and the capacitor 30 is a relatively short time constant, and is the time constant which is expanded by the balance of the system. The charge and discharge of the capacitor 30 is regulated by the associated resistors, and the circuitry described to this point forms the condition responsive time proportional control means 9 which ultimately has a switched output at 25. This general type of condition responsive time proportional control means is in and of itself known, but its normal operating is with a time constant that is too short for use in an effective residential home temperature control system.

The switched output at 25 is connected by conductor A to a counting means generally disclosed as 32. The counting means 32 is made up generally of four parts. The first is a pulse generating means or oscillator 33 that continuously supplies a series of pulses that are used to multiply the switched output at 25 and to control the digital logic of the counting means 32. The counting means 32 further includes a counter control logic block 34 which has as one of its inputs the switched output 25 on conductor A. The counter control logic 34 contains conventional NOT, AND and OR digital elements and these elements will not be specifically described.

The counting means 32 has a further section generally disclosed at 35 which is made up of a plurality of unidirectional counters. The unidirectional counters in their simplest form are conventional ripple counters. The fourth element that makes up the counting means 32 is a plant control logic element 36 that again contains conventional digital components. The plant control logic 36 contains in its output a C-D flip flop 37. The plant control logic 36 receives three inputs from other parts of the counting means 32 and provides output logic in the form of a reset R3, and an output means 40 for the counting means 32. The detailed operation of the counting means 32 is not material to the present invention. Only the inputs and outputs of the counting means 32 are of interest in connection with the present invention and will be mentioned in more detail subsequently. If a detailed consideration of the counting means 32 is desired, it can be found in the previously mentioned cross-referenced patent applications.

The output means 40 has two output conductors 41 and 42. When the condition control system being described is operating as a heating and cooling thermostat, the output conductor 41 would be connected to multi-stage heating equipment, and the output conductor 42 would be connected to control multi-stage cooling equipment. The C-D flip flop 37 responds to the plant control logic 36 so that the conductor 41 has a digital 1 while the output conductor 42 has a digital 0. When the system reverses thereby calling for an opposite type of control, the output conductor 41 has a digital 0 while the output conductor 42 has a digital 1. The output conductors 41 and 42 are connected to a condition control operating means that has been generally disclosed at 50. The condition control operating means 50 is capable of multi-stage sequencing of heating and cooling equipment, as will be explained.

Before the condition control operating means 50 is described, a count detection means generally disclosed at 43 will be described. The count detection means 43 includes a counting means 44 that is a unidirectional type digital counter, and its simple form is a ripple counter. The counting means 44 has a very low capacity so that it counts up in a very short period of time as compared to the counting means 32. The counting means 44 has been identified as a 0 and 100 percent load detection counter, as the count detection means 44 really detects the fact that the condition responsive time proportional control means 9 has ceased providing a switched signal indicating that it is sensing a condition outside of its proportional band. The detection of this condition is by means of conductor 45 which is connected to terminal L in the counter control logic 34. The terminal L has a cyclic output between the digital 0 and digital 1 whenever the condition responsive time proportional control means 9 and the output means 40 are out of phase of operation with each other indicating the system is within the proportional band. As long as the conductor 45 supplies a cyclic output, a reset input 46 is provided for the count detection means 44. This same signal is inverted by a NOT gate 47 and supplied to an AND gate 48. The AND gate 48 also is connected by a conductor 49 to the pulse generating means or oscillator 33.

As long as a cyclic output is provided at terminal L indicating that the system is in the proportional band, the repetitive cycling on conductor 45 provides a reset signal 46 to the count detection means 44 so the count detection means 44 does not have time to count up to a point where its output at conductor 51 changes even though it might be receiving an input through the AND gate 48. When the condition responsive time proportional control means 9 ceases to be in the proportional band and goes to a constant digital 1 or digital 0, the terminal L in the count control logic 34 becomes a 0 for a relatively long period of time so conductor 45 supplies no reset to the reset input 46 of the count detection means 44. This 0 is inverted by the NOT gate 47 and it is supplied as a 1 to the AND gate 48. The AND gate 48 is continuously receiving a series of 1's from the pulse generating means or oscillator 33 and the count detection means 44 then counts up in a relatively short time and provides an output at conductor 51 to the condition control operating means 50. The conductor 51 also can be supplied to a one shot circuit 52 that provides a reset pulse on conductors 53 and 54 to reset the counters in the counter control logic 34 and the counter 35. The one shot 52 and the resets 53 and 54 are optional features in the present device and merely make its operation respond without concern for a residual count in the counting means 32.

The conductors 41, 42 and 51 supply the basic inputs to the condition control operating means 50. The condition control operating means 50 has been shown as capable of controlling two heating stages and two cooling stages by means of simple digital logic which includes a number of AND gates, OR gates, a NOT gate and a group of C-D flip flops. The digital logic contained in the condition control operating means 50 can be varied extensively depending on the type of staging required and whether the staging is for one type of control, such as heat only, or for dual type staging of both heating and cooling. In connection with FIG. 1, a simple digital arrangement of logic will be specifically disclosed that is capable of turning "on" a first stage of heat and time proportionally modulating that stage of heat. The system will also be capable of then energizing a second stage of heat and returning to the first stage of heat for additional time proportional modulated operation. Any number of additional stages of heat could be added, but have not been shown. The logic disclosed in the condition control operating means 50 further allows for the addition of two stages of cooling when the cooling operation is called for. The digital logic also includes a cooling set point above heating offset thereby creating a differential between the heating and cooling stages of operation. This will be described in some detail in connection with the specifics of the condition control operating means 50.

The condition control operating means 50 has an AND gate 60 that is connected to the conductor 41. The AND gate 60 also is connected to an OR gate 61 which in turn is connected to the D terminal of a C-D flip flop 62. The C-D flip-flop has an output on conductor 63 to an AND gate 64 which is also connected to the conductor 41. The AND gate 64 in turn has its output at 65 connected to an OR gate 66 and to a conductor 67 that is capable of turning "on" a first stage of heat. That stage of heat could be electric heat, or could be any other type of heating plant.

The OR gate 66 has an output to the D terminal of a further C-D flip flop 70 which has its output on conductor 71. The output conductor 71 is connected to a conductor 72 that is connected to a second stage of heat. The conductor 71 also is connected to the subsequent stages for control of any additional stages of heating and have not been shown since they would be repetitious of the digital logic now being disclosed. The conductor 71 is connected back by a conductor 73 to the input of the OR gate 61 thereby providing part of the digital logic for the staging. The OR gate 66 has a feedback conductor 74 which comes from the next stages which have not been disclosed, and would function similarly to the conductor 73 for the disclosed stages. It will also be noted that the conductor 41 is connected to the subsequent stages as it is to each of the AND gates 60 and 64 for input control of the heating multi-stages.

The output of the count detection means 44 on conductor 51 is supplied at the C terminal of the C-D flip flop 62, as it is to all of the C-D flip flops that are disclosed. The output on conductor 51 is a clock pulse input to all of the C-D flip flops and clocks the digital logic on the D terminal through to the Q and $\overline{Q}$ terminals of each of the C-D flip flops. Each of the C-D flip flops 62 and 70 have their $\overline{Q}$ outputs 75 and 76 connected back through resistors to a common conductor 80. In the case of the $\overline{Q}$ output 75 the connection back to the common conductor 80 is through a resistor 81 while the output of the C-D flip flop 70 at the $\overline{Q}$ terminal 76 is through a further resistor 82. The resistors 81 and 82 and the common conductor 80 are very important to the present invention as they provide a feedback circuit on the conductor 80 to a terminal 83 of the bridge means 11 between the temperature responsive resistance 10 and the resistor 12. This feedback conductor 80 provides an offset effect on the bridge means 11 as more or less bias current is added or subtracted to the temperature responsive bridge depending on the number of stages that are either "on" or "off." The operation or function of this feedback will be described in more detail in connection with the operation of the device.

To this point the elements that make up the multistage control of heating has been disclosed. The system is capable of also multi-stage control of cooling equipment. This is accomplished by the digital logic that will now be described.

The cooling control output conductor 42 is provided as an ongoing output 42 to additional stages of cooling control beyond those shown. It is also supplied to the input of an AND gate 85 which in turn is connected to an OR gate 86 that is connected to a C-D flip flop 87. Once again the C-D flip flop 87 receives a clock pulse 51 and has an output on conductor 88 at the Q terminal to an additional AND gate 90. The AND gate 90 is connected to the conductor 42, as well as the conductor 88. The AND gate 90 in turn is connected at a junction 91 to an OR gate 92. The junction 91 is fed to a conductor 93 which in turn is connected through a resistance 94 to the common feedback conductor 80. The conductor 93 is used to turn "on" or "off" the first stage of cooling.

The OR gate 92 is further connected to the last disclosed C-D flip flop 95. The C-D flip flip has an output on conductor 96 that is connected to a feedback circuit 97 as an input to the OR gate 86, as well as to a conductor 98 which provides for connection to any additional cooling stages that may be sequenced. The conductor 96 is also connected through a further resistor 100 to the common conductor 80 and the conductor 96 is connected to the second cooling stage that is to be controlled. The subsequent cooling stages to be controlled have not been shown again because they would be repetitious of the stages already shown. A feedback circuit 101 is provided from the subsequent cooling stages to the input of the OR gate 92 in the same fashion as the feedback circuit 97 was provided to the OR gate 86. If the system is in its cooling mode, each time an additional stage of cooling is added by the generation of a 1 at the terminals 91 or 96, additional bias current is connected into the bridge means 11 via the feedback conductor 80.

The control system is completed by the addition of a cooling set point above heating circuit generally disclosed at 105. This circuit includes an OR gate 106 that has an output through a potentiometer 107 that adjusts the resistance to ground 108 through a further resistor 109 which is connected back to the common feedback conductor 80. The OR gate 106 is driven by a NOT gate 110 that is connected by a conductor 111 as an input to the AND gate 60 and receives its control signal from the $\overline{Q}$ terminal of the C-D flip flop 87. The OR gate 106 also receives an input from an AND gate 112 that has one terminal connected to conductor 42 and its other terminal connected to a conductor 113. The conductor 113 is connected to the $\overline{Q}$ terminal of the C-D flip flop 62 so that when the C-D flip flop 62 provides an output of a 1 at the $\overline{Q}$ terminal the AND gate 112 receives a digital 1 also. The operation of the cooling set point above heating means 105 will be discussed in connection with the operation of the system and is an optional feature in the present invention.

OPERATION OF FIG. 1

The system disclosed in FIG. 1 will be considered as a heating and cooling system and its operation described as such. The condition responsive time proportional control means 9 has a temperature sensor 10 which senses an ambient temperature. If the ambient temperature is within the proportional band of the control means 9, the output at A is cyclic. This cyclic output is reflected as an output at terminal L on conductor 45 and the reset 46 regularly resets the count detection means 43. The counter means 32 counts up and controls the output means 40 so that a digital 1 or digital 0 appears on conductors 41 and 42. If it is assumed that the system is operating in the proportional band and is calling for heat, the counting means 32 will provide a signal to the plant control logic 36 to cause the C-D flop flop 37 to cause a 1 to appear at the Q terminal and thereby provide a 1 on conductor 41 and a 0 on conductor 42. The 1 on conductor 41 is provided as an input 1 to the AND gate 60 and at this particular point of operation it will be assumed that 1 exists on the conductor 111 from the $\overline{Q}$ terminal of the C-D flip flop 87. This would indicate that no cooling was being required as a 1 on the $\overline{Q}$ output of the flip flop 87 would mean that a 0 appears on conductor 88 which would be the normal state for the cooling sections to be in an "off" condition.

With a digital 1 appearing both on conductors 41 and 111, the AND gate 60 provides a 1 to the OR gate 61 which in turn provides a 1 to the input of the C-D flop flop 62. Upon a call for heat, that is the condition responsive time proportional means 9 is outside of the proportional band, the output on terminal A becomes a constant 1 with the output at terminal L being a constant 0. With no reset at terminal L there is no reset pulse on conductor 45 and the count detection means 44 is no longer in a reset condition. The 0 on conductor 45 is inverted by the NOT gate 47 and is fed into the AND gate 48 along with a series of pulses on conductor 49 from the oscillator 33. The count detection means 44 counts up in a very short period of time and provides an output 1 on conductor 51. The output on conductor 51 is fed to the clock terminals of all of the C-D flip flops and causes the C-D flip flop 62 to clock the 1 at the D terminal through to the Q output on conductor 63. The 1 on conductor 63 is combined with the 1 from the conductor 41 indicating that heat is necessary and a 1 appears at the junction 65 and on conductor 67 thereby providing a source of energization for the first stage of heat.

At the time that the C-D flip flop 62 changes state, the $\overline{Q}$ terminal went from a 1 to a 0 and this changes the voltage that appears across the resistance 81 that is connected as a feedback on conductor 80 to the bridge means 11. This change in bias current to the bridge changes the bridge balance as if a change in the set point or control point was made thereby offsetting the bridge by an amount compatible with the fact that the first stage of heating has been added. At this point the first stage of heating is either modulated "on" and "off" in a time proportional manner by the switching at the output means 40 by the conductor 41 receiving either a 0 or a 1, or the output to the first heating stage is kept "on" constantly indicating that an insufficient amount of heat is being supplied to satisfy the demand including the offset provided by the change in bias current of resistance 81 to the bridge circuit 11. In this case, the count detection means 44 again counts up and provides an additional pulse on the conductor 51. At this point in time a 1 exists at junction 65 which is fed through the OR gate 66 to the D terminal of the C-D flop flop 70 and is immediately clocked through by the clock pulse on conductor 51 to the conductor 71 where it appears on the conductor 72. The voltage on conductor 72 then activates the second stage of heating. At this same time the $\overline{Q}$ terminal of the flip flop 70 reverts to a 0 and there is no voltage at 76 thereby removing the bias current of resistance 82 from the feedback circuit or conductor 80 to the bridge means 11. This again offsets for the fact that an additional stage of heating has been added.

At this point the second stage of heat is locked on and the first stage of heat will cycle in a time modulated fashion as the plant control logic 36 supplies 0's and 1's to the conductor 41. If the installed system has a sufficient number of heating stages to provide a satisfying amount of heat, the system will stabilize with an appropriate number of stages after the first stage in an "on" condition to supply heat with the first stage being time modulated to provide the desired control.

When the heat of a stage is no longer required, the output of the conductor A will switch to a 0 and the count detection means 44 will again start counting up. At this time the output of the plant control logic 36 is a 0 on conductor 41 and count detection means 44 provides clock pulses to the C-D flip flops 62 and 70. Depending upon the reduction in heat demand, the appropriate number of stages of heat are turned "off" in sequence from the highest number of operated stages and the first stage will time modulate if that is required. If no heat is required, the first stage will stop time modulation with stage 1 also being in an "off" state.

If the system now moves to the point where cooling is desired, a constant 1 will appear on conductor 42 and will be fed to the AND gate 90 and the AND gate 112 of the cooling set point above heating set point means 105. At this time the AND gate 112 receives 1's on both of the conductors 42 and 113 and that output is supplied through the OR gate 106 to the potentiometer 107 to provide an offset through the resistor 109 to the common conductor 80 to the bridge terminal 83. This shifts the bridge so that there is a definite deadband between heating and cooling and prevents the system from oscillating between the heating and cooling operation unnecessarily. If it is assumed that the system has moved sufficiently to the cooling demand, the cooling set point above heating output remains fixed and the first stage of cooling is clocked in when the count detection means 44 completes its count indicating that insufficient cooling is present. That is accomplished by the clock pulse on conductor 51 appearing as a clock input to the C-D flip flop 87 where a 1 is clocked into the AND gate 90 to supply a 1 at junction 91 and where that 1 is fed through to the D terminal of the C-D flip flop 95 to wait for the next clock pulse if an additional stage of cooling is required. It is noted that as the stage of cooling is added, that the resistance 94 and then the resistance 100 adds bias current in the bridge means 11 by conductor 80 but is added in reverse fashion to that provided by the resistances 81 and 82 of the heat stages. A sufficient number of offset resistors and stages are provided to accomplish the desired cooling operation. As the cooling demand increases the stages come "on" with the first stage being first and then up through the number of stages available. Only two stages have been shown since the digital structure for additional stages would be the same as for stage two and could be connected in at the point indicated in the drawing.

With the present arrangement it is possible to provide a temperature control system that is capable of multistage heating and/or cooling operation. It is quite apparent that any number of stages of heating or cooling could be used and the disclosure of FIG. 1 has been directed to an arrangement where the first stage of heating is modulated.

Figure 2:
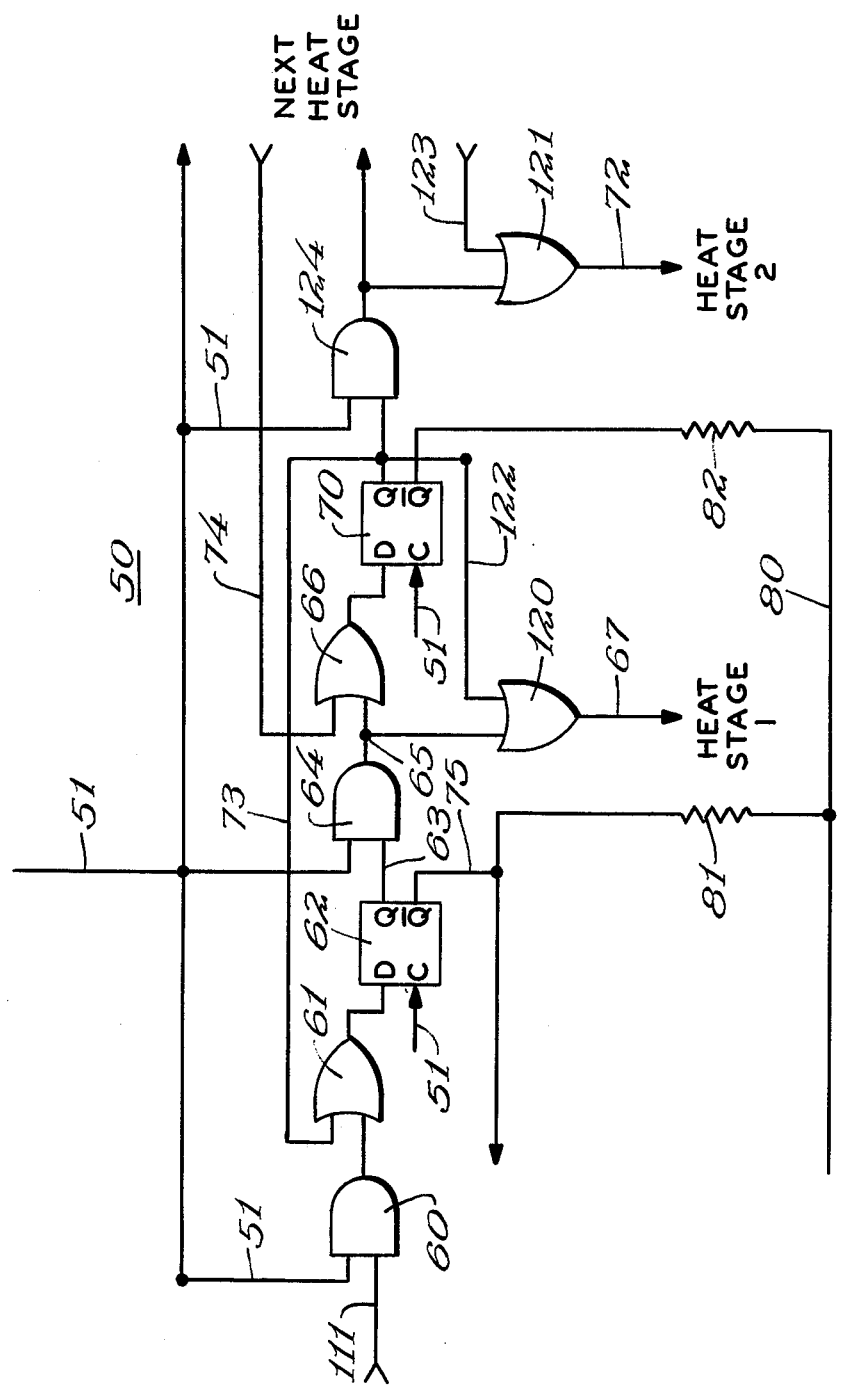
FIG. 2 is a partial diagram showing how the staging could be altered.

In FIG. 2 there is disclosed a slight modification of the heat staging section of the condition control operating means 50. In this particular configuration the circuit has been changed to allow each stage to modulate in turn as opposed to having the first stage modulate and then pulling on a second stage with the return of the modulation back to the first stage. All of the similar elements have been marked with the same reference numerals. Basically the only change necessary is the addition of the OR gates 120 and 121 as part of the driving circuitry for the first stage of heat through the conductor 67 and for the second stage of heat through the conductor 72. The OR gate 120 is fed by a signal on conductor 122 while the OR gate 121 receives an additional driving signal through an additional feedback conductor from the next stage 123 and the use of an AND gate 124.

With the digital logic shown in FIG. 2 it is possible to cause each stage to modulate in the system thereby providing a different type of control with a minor change in the digital logic involved. Any number of different digital logic configurations are possible and are readily apparent to anyone skilled in the digital logic art.

The present invention has been disclosed in the specific form as a heating and cooling system where heating can be brought "on" and modulated, and that the cooling is brought "on." This could be altered where the cooling equipment was capable of being modulated by modification again of the digital logic to the type of logic shown in the heating section. It is quite obvious that the internal digital logic of the device is not significant as it could be altered readily by anyone working in this art. The main concept involved in the present invention is the idea of utilizing a condition responsive time proportional control means 9 which has a cyclic output in the proportional band and a constant or fixed output when the device is outside of the proportional band. The operation is sensed by a count detection means, such as the count detection means 44, and the digital logic then sequences the necessary heating or cooling stages into operation. With the operation of each additional stage of heating or cooling an appropriate bias current is either added to or subtracted from the bridge circuitry providing an offset to the bridge to compensate for the fact that an additional stage of heating or cooling has been provided. With this arrangement it is possible to coordinate the state of the sensing circuit with the number of stages of heating or cooling that are in operation in order to bring about a high degree of control. It is quite obvious that the specifics of the means in which this is carried out can be altered extensively by one skilled in the art. The inventors, therefore, wish to be limited in the scope of their invention solely by the scope of the appended claims.

The embodiments of the invention in which an exclusive property or right is claimed are defined as follows:

1. A condition control system, including: condition responsive time proportional control means having switched output means; said switched output means providing repetitively switched output signals at a rate representative of a time constant of said time proportional control means when said condition responsive means senses a condition which is within a selected range; said switched output means providing constant output signals when said condition is outside of said selected range; counting means having input means responsive to said switched output signals; said counting means including pulse generating means; said pulse generating means having output means connected to said counting means and providing signals thereto; said counting means combining said condition responsive repetitively switched output signals and said pulse generating output signals to expand a time constant of said condition responsive time proportional control means at an output means of said counting means; count detection means connected to said counting means; said count detection means including second counting means which counts when said first counting means is not counting, and which is reset when said first counting means is counting; said count detection means including output means having an output pulse when said second counting means counts to its capacity; condition control operating means connected to said count detection means output means to receive said output pulse and further being connected to said first counting means output means; said two counting means outputs arranged to operate said condition control operating means; said condition control operating means further including feedback circuit means to said condition responsive time proportional means; and said feedback means altering an input of said condition responsive control means when said condition control operating means is operated by the outputs from said first counting means and said count detection means.

2. A condition control system as described in claim 1 wherein both said counting means included unidirectional counting means.

3. A condition control system as described in claim 2 wherein said condition responsive time proportional control means includes bridge means responsive to a condition being controlled; and said feedback circuit means altering the balance of said bridge means.

4. A condition control system as described in claim 3 wherein said condition control system is a temperature control system; said bridge means included temperature responsive resistance means as a sensing means for said bridge means; and said condition control operating means is adapted to control temperature altering means.

5. A condition control system as described in claim 4 wherein said unidirectional counting means of said count detection means is a counting means with a capacity smaller than said first counting means.

6. A condition control system as described in claim 5 wherein said condition control operating means includes a plurality of condition control stages that are progressively activated by said output pulses from said count detection means, and are responsive to said output means of said first counting means.

7. A condition control system as described in claim 6 wherein said condition control stages are adapted to control heating and cooling equipment.

8. A condition control system as described in claim 7 wherein said condition control operating means further includes set point adjusting means having input means connected to said condition control stages and output means connected to said bridge means to provide a control signal to said bridge means to separate the operation of said condition control stages between heating and cooling.

9. A condition control system as described in claim 8 wherein said output means of said count detection means further includes a one-shot pulse generator activated by said output pulse from said count detection means; and said one-shot pulse generator connected to said first counting means to reset said first counting means each time said count detection means counter provides an output pulse.

10. A condition control system as described in claim 6 wherein said plurality of condition control stages includes a first stage that is adapted to modulate a condition control load; and wherein the balance of said plurality of stages are adapted to switch a condition control load.

11. A condition control system as described in claim 10 wherein said condition control stages are adapted to control heating and cooling equipment.

12. A condition control system as described in claim 11 wherein said condition control operating means further includes set point adjusting means having input means connected to said condition control stages and output means connected to said bridge means to provide a control signal to said bridge means to separate the operation of said condition control stages between heating and cooling.

13. A condition control system as described in claim 12 wherein said output means of said count detection means further includes a one-shot pulse generator activated by said output pulse from said count detection means; and said one-shot pulse generator connected to said first counting means to reset said first counting means each time said count detection means counter provides an output pulse.

* * * * *